April 25, 1961

R. E. CARBAUH 2,981,938

COMBINED OVERHEAT AND FLAME DETECTOR SYSTEM

Filed Dec. 21, 1955

2 Sheets-Sheet 1

INVENTOR
ROBERT E. CARBAUH

BY Scrivener + Parker

ATTORNEYS

April 25, 1961 R. E. CARBAUH 2,981,938
COMBINED OVERHEAT AND FLAME DETECTOR SYSTEM
Filed Dec. 21, 1955 2 Sheets-Sheet 2

INVENTOR
ROBERT E. CARBAUH
BY Scrivener + Parker
ATTORNEYS

United States Patent Office 2,981,938
Patented Apr. 25, 1961

2,981,938
COMBINED OVERHEAT AND FLAME DETECTOR SYSTEM

Robert E. Carbauh, Medfield, Mass., assignor to Petcar Research Corporation, Washington, D.C., a corporation of New Jersey Filed Dec. 21, 1955, Ser. No. 554,577

2 Claims. (Cl. 340—227)

This invention relates broadly to fire detecting systems and devices which are placed within a space which is to be monitored for fires and which operate to provide a signal or alarm when combustion occurs. More particularly, the invention provides such a system which is operative to provide an indication either when the ambient temperature in the monitored space exceeds a predetermined value or when actual flame impinges on the sensing element of the detector system.

Fire detector systems of the so-called "overheat" types are now known and in use. These systems include a sensing element, electrical or electronic means and an indicator, and are operative to produce an indication when the ambient temperature at the sensing element exceeds some predetermined value which is usually that of combustion of combustible materials within the space being monitored. Other fire detector systems, known as "flame detector" systems, are also now known and in use and include a sensing element, electronic or electrical means and an indicator, and are operative to produce an indication only when actual flame bridges the sensing element and ground. Both of these types of fire detector systems have advantages and disadvantages which are well known to those skilled in the art and it has long been known that a detector system which would provide an indication in the event either of increase in ambient temperature at the sensing element or impingement of actual flame on the sensing element would be the most desirable system. It has been the objective of my invention to provide such a combined system and a successful, practical and operative combined system is provided by this invention.

Figure 1:
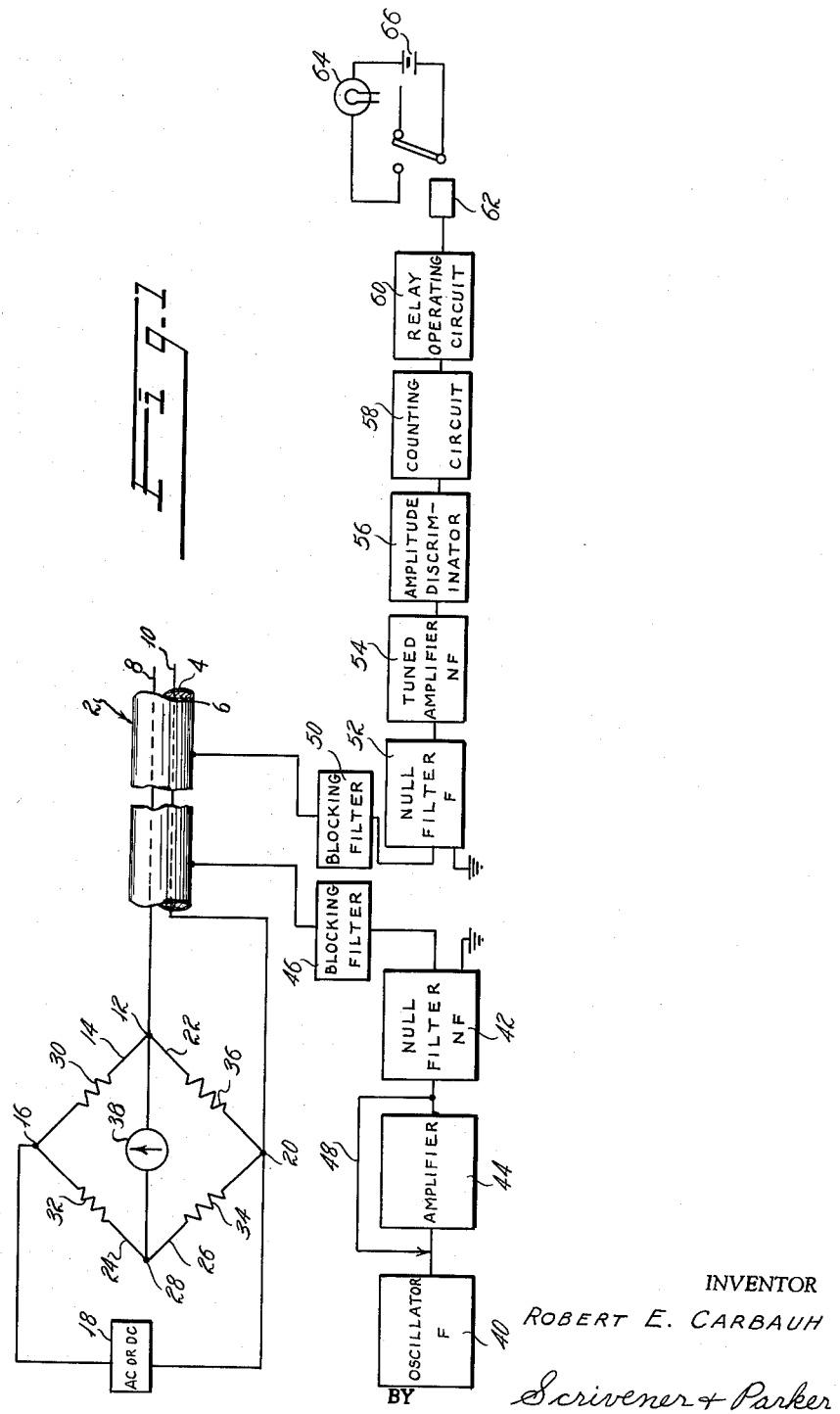
Figure 2:
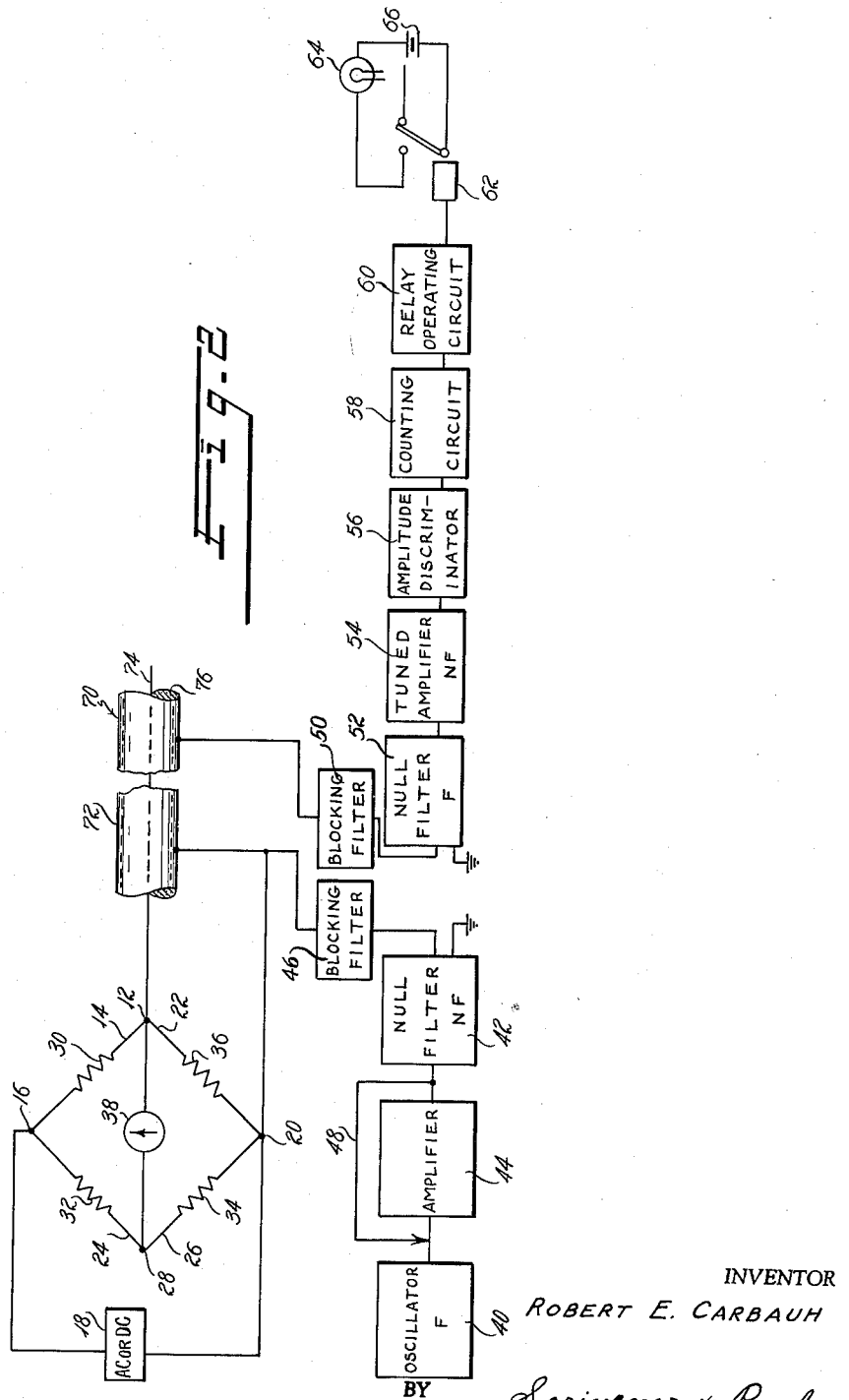

The invention is described in the following specification and illustrated in the accompanying drawing, in which Fig. 1 is a part schematic and part block diagram showing a combined detector system according to the invention, and Fig. 2 shows a combined system which is similar to that illustrated in Fig. 1 but in which a different type of sensing element is used.

The detector system disclosed in Fig. 1 comprises a sensing element 2 which takes the form of a metallic tube 4 filled with a thermistor material 6 in which are embedded two wires 8, 10 which extend longitudinally of the tube 4 and are insulated from each other and from the surrounding tube 4 by the thermistor material 6. This thermistor material is well known in the art and normally insulates the wires 8, 10 from each other and from the tube 4, but at some predetermined elevated temperature becomes electrically conductive and thus provides an electric connection between the wires 8, 10. At its one end, the wire 8 is connected to one terminal 12 of arm 14 of a bridge circuit, the other terminal 16 of which is connected to one terminal of a source of current 18. The second conductor 10 of the sensing element is connected at its one end to the terminal 20 of an arm 22 of the bridge, the other terminal of which arm is at 12. The third and fourth arms 24, 26 of the bridge are connected at 28, their other terminals being respectively at 16 and 20. Each arm includes a resistance and these are indicated at 30, 32, 34 and 36. An indicator 38 is connected between the terminals 12 and 28 of the bridge.

A source of alternating voltage 40 is connected to the external tube 4 of the sensing element 2 through a null filter 42, which eliminates from the energy supplied to the tube 4 one harmonic or an ensemble of harmonics, other than the zero or first harmonic, of the frequency generated by the source, and through an amplifier 44 and a blocking filter 46, thus developing between tube 4 and ground an alternating voltage having the fundamental frequency and all of the harmonics thereof produced by the source 40 except the harmonic frequency or ensemble of harmonics attenuated by filter 42. A feedback circuit 48 is associated with amplifier 44 and stabilizes the operation of the signal source against supply voltage changes and lowers the output impedance. The latter is desirable in order to render the system operative even though an accidental low resistance circuit may appear on a portion of tube 4 far from the source. The tube 4 of the sensing element is also connected through blocking filter 50, null filter 52, tuned amplifier 54, amplitude discriminator 56, counting circuit 58, and relay operating circuit 60 to a relay 62 which is operable when energized, to close a circuit including an indicating device, such as lamp 64, and a source of electric energy 66. The blocking filters 46, 50 isolate the electric energy produced by source 18 from elements 40 to 66 of the flame-responsive system, when such energy appears on tube 4 of the sensing element at the predetermined elevated temperature. The null filter 52 is tuned to accept only the harmonic or ensemble of harmonics attenuated by null filter 42 and to reject all other frequencies. The amplifier 54 is also tuned to the frequency accepted by filter 52 and amplifies the signal produced by it.

The various elements shown in the schematic and block diagram of Fig. 1 are, in themselves, of conventional design. Thus, the oscillator 40 may be of any well-known construction to produce an alternating frequency. The null filter 42 may be of the well known bridge-T type but may also have any other form which will be operative to attenuate substantially to zero an harmonic or ensemble of harmonics of the fundamental frequency supplied to the filter by oscillator 40. The amplifier 44 may be a phase-inverter followed by a pair of triodes connected in push-pull. The inverse feedback link provides that the amplifier be linear, low-gain and that it have a low output impedance. The blocking filters 46, 50 may be of any known type or construction which will isolate the direct or alternating current of the source 18 from the flame-detecting system comprising elements 40 to 66. The amplifier 54 may comprise two stages, the first of which contains circuitry for the rejection of the frequency developed by the source 40, and the second stage of which is sharply tuned to the harmonic or ensemble of harmonics eliminated from the frequency of the source. The amplitude selection circuit 56 may, if desired, be a device or circuit known as the Schmitt trigger circuit, which is described in "Electronics of the Nuclear Energy Series" by Elmore and Sands (McGraw-Hill), but may be any other known circuit or device which will be operative to pass only signals greater than some predetermined amplitude. The counting circuit 58 may be of a conventional type except that it is not reset but is discharged at a slow rate through a resistor. The relay operating circuit 60 is conventional and provides a means for passing a current through the relay that is responsive to the voltage produced by the counting circuit. The relay 62, signal 64 and battery 66 are entirely conventional.

In the use and operation of the fire detector system disclosed in Fig. 1 of the drawing, the sensing element 2, which can take the form of an elongated cable-like element, is placed within or led through a space in which fire may occur and which is to be monitored for fire. The two wires 8, 10 of the sensing element are electrically insulated from each other at normal lower temperatures because of the fact that they are separated by the thermistor material 6, and the bridge is balanced so indicator 38 is not energized. If the ambient temperature to which the sensing element is exposed increases to a predetermined value the thermistor material 6 becomes electrically conductive, thus electrically connecting the wires 8, 10 of the sensing element and unbalancing the bridge circuit, thus causing the indicator 38 to provide an indication that the temperature within the monitored space has increased to a predetermined value.

The source of alternating voltage 40 supplies to the tube 4 of the sensing element an alternating frequency from which one harmonic or an ensemble of harmonics, other than the zero or first harmonic of the fundamental frequency, has been substantially completely attenuated. Thus, if the oscillator 40 generates alternating voltage having frequency F and harmonics thereof the voltage supplied to the tube 4 will have the fundamental frequency F and harmonics thereof except a selected harmonic nF, in which n is a whole number and is not 0 or 1. This harmonic is removed from the frequency of the oscillator by null filter 42 after the oscillator voltage has been amplified at 44 and stabilized by the feedback circuit 48. The tube 4 of the sensing element is connected to the null filter 52 which rejects the fundamental frequency F, and to the amplifier 54 which is tuned to receive only the harmonic or ensemble of harmonics removed from the fundamental frequency by the filter 42. In the absence of a flame impinging on ground and on tube 4 of the sensing element no signal will appear in amplifier 54 but, when a flame bridges tube 4 and ground, the harmonic nF will be detected. The amplitude discriminator 56 is set to admit signals having at least a predetermined amplitude which is determined so as to eliminate signals of the nature of noise, hum and the like, whereby the threshold of the discriminator 56 is such that these extraneous signals cannot operate the indicator, which will be operated only by signals of predetermined amplitude due to reception of the harmonic nF when a flame impinges on tube 4. The counting circuit 58 provides a short delay which prevents indications by high amplitude transient voltages and the relay operating circuit 60 provides the current to operate the relay.

It will be seen that the detector system provided by the invention will produce an indication when the sensing element is subjected to a predetermined high temperature or when flame actually impinges on the sensing element, thus providing universal protection.

A modified system according to the invention is disclosed in Fig. 2 of the drawings and is the same in all respects as the system disclosed in Fig. 1, with the exception that it includes a sensing element of a different type. This sensing element 70 comprises an outer metallic tube 72 having an electrically conductive wire 74 within and extending longitudinally and concentrically of the tube. The wire 74 is separated and electrically insulated from the tube 72 by thermistor material 76 which fills the tube and which is electrically non-conductive at normal lower temperatures but becomes electrically conductive at a predetermined high temperature. The wire 74 is connected to terminal 12 of the bridge circuit and the outer tube 72 of the sensing element is connected to terminal 20 of the bridge. In all other respects the system disclosed in Fig. 2 is constructed and operative in the same manner as that disclosed in Fig. 1.

While I have described and illustrated certain embodiments of the invention, it will be apparent to those skilled in the art that other embodiments, as well as modifications of those disclosed, may be made and practised without departing from the spirit or scope of the invention, for the limits of which reference must be made to the appended claims.

What is claimed is:

1. A detector system comprising means for indicating the existence of a predetermined abnormal high temperature consisting of a cable-like element of indefinite continuous length comprising a bendable tubing element formed of a material of relatively high heat conductivity, a unitary assembly disposed within the tubing element and being in heat-transfer relation thereto but being separate therefrom and comprising two electrically conductive uninsulated wires which are substantially co-extensive in length with the tubing element and are spaced therefrom and from each other throughout their lengths, and a material which is substantially nonconductive to electricity at normal lower temperatures and which becomes conductive to electricity at abnormal higher temperatures surrounding and in contact with said wires and which maintains them in closely spaced relation to each other and tightly engages the interior surface of the tubing element to provide an electrically conductive path between the wires in substantially instantaneous response to abnormal higher ambient temperatures to which the exterior of the tubing element may be subjected, while electrically insulating the wires from each other at normal lower temperatures, a source of electric energy and an indicating means electrically connected to each other and to said wires at one end of said element whereby the existence of a predetermined high ambient temperature at any location along the length of the cable-like element will cause the temperature responsive member thereof to establish an electrically conductive path between the wires at said location to complete a circuit through the temperature responsive member, the wires, the source of electric energy and the indicating means to energize the indicating means, means for supplying between said tubing element and ground an alternating voltage having a fundamental frequency and from which there has been attenuated to negligible value an harmonic or ensemble of harmonics being neither the zero nor first harmonic of the fundamental frequency, receiving means connected between said tubing element and ground and tuned to receive only the attenuated harmonic frequency whereby a signal of the attenuated harmonic frequency will be detected by said receiving means upon impingement of a flame on said tubing element and ground, and means for indicating the detection of such a received signal.

2. A detector system comprising means for indicating the existence of a predetermined abnormal high temperature consisting of a cable-like element of indefinite continuous length comprising a bendable tubing element formed of an electrically conductive material of relatively high heat conductivity, a unitary assembly disposed within the tubing element and being in heat-transfer relation thereto but being separate therefrom and comprising an electrically conductive uninsulated wire which is substantially co-extensive in length with the tubing element and is concentric therewith throughout its length, and a material which is substantially nonconductive to electricity at normal lower temperatures and which becomes conductive to electricity at abnormal higher temperatures surrounding and in contact with said wire and which maintains it in concentric relation to the tubing element to provide an electrically conductive path between the wire and tubing element in substantially instantaneous response to abnormal higher ambient temperatures to which the exterior of the tubing element may be subjected, while electrically insulating the wire from the tubing element at normal lower temperatures, a source of electric energy and an indicating means electrically connected to each other and to the wire and tubing element at one end of said element whereby the existence of a predetermined high ambient temperature at any location along the length of the cable-like element will cause the temperature responsive member thereof to establish an electrically conductive path between the wire and tubing element at said location to complete a circuit through the temperature responsive member, the wire and tubing element, the source of electric energy and the indicating means to energize the indicating means, means for supplying between said tubing element and ground an alternating voltage having a fundamental frequency and from which there has been attenuated to negligible value an harmonic or ensemble of harmonics being neither the zero nor first harmonic of the fundamental frequency, receiving means connected between said tubing element and ground and tuned to receive only the attenuated harmonic frequency whereby a signal of the attenuated harmonic frequency will be detected by said receiving means upon impingement of a flame on said tubing element and ground, and means for indicating the detection of such a received signal.

References Cited in the file of this patent

UNITED STATES PATENTS

| | | |
|---|---|---|
| 2,236,891 | Bridges | Apr. 1, 1941 |
| 2,477,348 | Postal | July 26, 1949 |
| 2,659,067 | Peters | Nov. 10, 1953 |
| 2,709,799 | Norton | May 31, 1955 |
| 2,804,608 | Carbauh | Aug. 27, 1957 |
| 2,946,989 | Loeber | July 26, 1960 |